United States Patent Office 3,769,362
Patented Oct. 30, 1973

3,769,362
OXYDEHYDROGENATION OF ETHANE
William Q. Beard, Jr., Wichita, Kans., assignor to Ethyl Corporation, Richmond, Va.
No Drawing. Original application July 14, 1969, Ser. No. 841,622, now abandoned. Divided and this application June 17, 1971, Ser. No. 154,179
The portion of the term of the patent subsequent to Feb. 22, 1989, has been disclaimed
Int. Cl. C07c 11/12
U.S. Cl. 260—677 XA
10 Claims

ABSTRACT OF THE DISCLOSURE

An ethane to ethylene oxydehydrogenation process and catalyst therefor which is composed of a low concentration of iron chloride with rare earth halide, the ratio of rare earth halide to iron chloride being greater than 1:1. Other preferred catalyst components include alkali metal halide and manganese halide.

This application is a divisional application of Ser. No. 841,622 filed July 14, 1969 and now abandoned.

BACKGROUND OF THE INVENTION

Unsaturated hydrocarbons are commonly produced by either thermal cracking or catalytic cracking or a combination of both. In the known processes the principal discharge is low conversion of the saturated hydrocarbon to unsaturated hdyrocarbon. In the literature, the reported conversion is rarely greater than about 40 percent. See, for instance, U.S. Pat. 3,119,883, U.S. Pat. 2,971,995, and British Pat. 969,416. It will be seen that product streams containing less than 30 percent of ethylene are not uncommon. In addition to low hydrocarbon conversion, the prior art processes often result in a product containing a variety of materials which are difficult to separate. For instance, in the case where ethane is the feed material substantial quantities of acetylene and methane are often produced. When ethylene is the desired product, serious problems are encountered due to the difficulty of separating these materials. Also, when a catalyst is employed in the known processes, experience has shown that periodic shutdown is necessary due to the fouling of the catalyst with tars and resins. Also, in many cracking operations exceedingly high temperatures are often necessary, e.g. see U.S. Pat. 3,119,883.

The primary purpose of this invention is to provide a process for the dehydrogenation of ethane to produce ethylene wherein the conversion of ethane to ethylene is substantially increased. Other purposes are the provision of (1) a continuous process wherein shutdown due to catalyst fouling is avoided, (2) a process which does not require excessively high temperatures, and (3) a process wherein the by-products formed, in addition to ethylene, are commercially valuable. Other purposes and advantages of this invention will become apparent hereinafter.

SUMMARY OF THE INVENTION

The present invention provides a process for the production of ethylene which comprises, in combination, contacting reactants comprising ethane, hydrogen chloride and oxygen with a fluidized catalytic material comprising a catalyst and a support in a reaction zone, said catalyst comprising from about 0.15 weight percent to about 3 weight percent iron chloride, based on the total weight of said catalyst and support, and rare earth halide, the weight ratio of said rare earth halide to said iron chloride being in excess of 1 to 1.

In addition the invention provides a supported catalyst for the production of ethylene by the dehydrogenation of ethane in the presence of hydrogen chloride and oxygen which comprises, in combination, from about 0.15 weight percent to about 3 weight percent iron chloride, based on the total weight of said supported catalyst, and rare earth halide, the weight ratio of said rare earth halide to said iron chloride being in excess of 1 to 1.

DESCRIPTION OF THE PREFERRED EMBODIMENTS

The above and other purposes are accomplished by a process for the dehydrogenation of ethane and the production of ethylene by contacting ethane with a fluidized catalyst, hydrogen chloride, and oxygen, the oxygen usually being in the form of air, at a temperature above 350° C., or preferably from about 400° C. to about 650° C., and a pressure above atmospheric, or preferably from about one atmosphere to about 30 atmospheres, the fluidized catalyst being composed of a mixture containing essentially from about 0.15 percent to about 3.0 percent iron chloride and from about 5 percent to about 20 percent rare earth halides (hydrated) supported on a fluidized carrier, the percentages being based on the total weight of catalyst and support. The weight percent of the rare earth halides as set forth herein is based on the hydrated form, although such halides need not be hydrated during use. In the practice of this process, ethylene is recovered as the major porduct.

According to this process, ethane is converted to ethylene in yields as high or higher than 60 percent, and even as high as, for example 90 percent, without the occurrence of catalyst fouling or the necessity of the excessive temperatures normally associated with cracking operations. Furthermore, this method requires only non-consuming use of hydrogen chloride, which was at one time a troublesome by-product in the petrochemical industry and often disposed of by dumping into pits containing oyster shells, but now is in short supply and strong demand. Moreover, this process utilizes ethane, an abundant and inexpensive hydrocarbon, as a raw material for conversion into the more valuable chemical, ethylene.

The primary reason for these improved results is the use of a fluidized, supported mixture of iron chloride and rare earth halide. In all instances the ratio of rare earth halide (hydrated), preferably rare earth chloride, to iron chloride must exceed 1:1 and should very preferably fall within the ranges hereinafter specified. Preferred conditions are (in weight percent based on the total amount of catalyst and support) a catalyst mixture supported on a fluidized solid carrier containing essentially from about 0.15 to about 3.0 percent iron chloride and from about 5 percent to about 20 percent rare earth halides (hydrated). Preferably, the catalyst mixture contains from about 0.3 percent to about 0.4 percent iron chloride and from about 8 to about 15 percent rare earth halides (hydrated). When the amount of rare earth halide and iron chloride in the catalyst significantly deviates from that specified above, ethylene is not usually produced and, if produced at all, is produced in only small quantities. Instead, chlorinated hydrocarbons are produced as the major product. This very significant relationship between the amount of iron chloride and rare earth chloride will be illustrated by the examples set forth below.

By the term "rare earth halide" is meant the halides of the elements in the Lanthanum series, that is, elements having an atomic number of from 57 through 71, and mixtures of these compounds. Included among the rare earth elements are thulium, lanthanum, cerium, praseodymium, neodymium, promethieum, samarium, europium, gadolinium, terbium, dysprosium, holmium, erbium, ytterbium, lutecium, yttrium. Among the elements cerium is preferred, but praseodymium and neodymium are also excellent catalyst components for the present process. However, since these materials are usually found in nature in mixtures, it is very convenient to use a commercially available mixture. The mixtures used in formulating the catalyst contain rare earth halides, preferably chlorides, or oxides or other mixtures. Examples of minerals containing the rare earths are zircon, thorite monazite, gadolinite, cerite, orthite, and the like. The mixture known in the art as didymium is suitable, but the mixture extracted from monazite without removal of cerium and thorium is preferred.

The temperature of this process should be above 350° C. and should preferably range from about 400° C. to about 650° C. and more preferably from about 475° C to about 600° C. It is desirable that the pressure range from about 1 atmosphere to about 30 atmospheres and preferably from about 1 atmosphere to about 20 atmospheres. The oxygen used in this invention is usually used in the form of air; however, pure oxygen may be employed if desired.

The fluidized support may be any of the known inert carriers such as sand, diatomaceous earth, alumina, silica gel, pumice, bauxite, chromia-alumina, and the like. Preferably the catalyst support is chromia-alumina, but alumina and silica are highly satisfactory. It is highly preferable that the particle size of the impregnated catalyst be within the range of from about 120 mesh to about 325 mesh (U.S. Sieve Number). In other words, the preponderance of the catalytic material be no coarser than about 120 mesh and no finer than about 325 mesh. There is no necessity that all particles be of uniform size. The size distribution generally varies throughout the ranges indicated. Usually it is preferred that not more than about 90 percent of the catalyst be finer than 325 mesh and that not more than about 50 percent of the catalyst be coarser than 120 mesh.

If desired, an alkali metal halide may be added to the catalyst mixture in a concentration of from about 0.01 percent by weight to about 5 percent by weight, based on the total weight of catalyst and support. Preferably, it is added in concentrations of about 0.05 percent to about 3 percent, and more preferably from about 0.1 to 2 percent. The alkali metal halides employed are preferably the chlorides of lithium, sodium, potassium, rubidium and cesium. The addition of alkali metal halide to the catalyst mixture is a preferred embodiment of the invention, and among the alkali metal halides, lithium halide is most preferred.

Other catalyst additives also enhance the performance of the catalyst of this invention. Among such additives, manganese chloride in a concentration of from about 1 to about 10 percent by weight based on the total weight of catalyst and support, is preferred. Other suitable catalyst additives incldue zinc chloride, calcium chloride, and titanium chloride, among which calcium chloride is preferred in a concentration of from about 1 to about 10 percent by weight, based on the total weight of catalyst and support.

The addition of copper chloride to the iron chloride containing catalyst has also been found beneficial, depending upon the type and quantity of other components in the catalyst. A concentration of from about 1 to about 10 weight percent of the copper chloride added, based on the total weight of catalyst and support, is preferred.

Another important feature of the invention is the molar feed ratio of ethane/hydrogen chloride/air which varies in the ranges 1/1 to 3/2 to 5. When oxygen is substituted for air as the feed, this ratio varies in the ranges 1/1 to 3/0.4 to 1.

The rate of flow of gases through the reaction zone is subject to some variation. Thus, sufficient flow of gases must be provided for fluidization of the supported catalyst. On the other hand, gas flow should not be so extreme as to blow significant quantities of the catalyst out of the reaction zone. It is generally preferable that the superficial linear velocity of the gases entering the reactor be maintained within a range of from about 0.1 to about 5 feet per second. More preferably, for reasons of economy, the superficial linear velocity is maintained at from about 0.5 feet per second to about 3.5 feet per second. A suitable contact time is one ranging from about 1 second up to about 20 seconds, and preferably, for best conversion, the contact time should be from about 2 to about 15 seconds.

The feed ethane, oxygen (which may be used pure or as in air) and hydrogen chloride may be fed together into the bottom of the reactor. This can be varied however, and it is indeed often desirable to do so. For instance, two of the reactants are fed into one portion of the reaction zone and the other reactant into another portion. Thus, the hydrogen chloride and air can be fed together into the reaction zone at a point vertically displaced from the point at which the ethane is fed into the reaction zone. It is preferable to feed the hydrogen chloride and the oxygen into the bottom of the reactor and to feed the ethane into the reaction zone at a point vertically displaced therefrom.

In the following examples, which are intended to be descriptive rather than restrictive, ethane, hydrogen chloride, and air (or pure oxygen) were fed into the bottom of a vertically elongated reaction vessel. The reaction vessel was precharged with a fluidizable catalyst. The catalyst compositions are in weight percent, based on the total weight of catalyst and support. The weight percent of the rare earth chlorides catalyst component (including cerium chloride and didymium chloride) is calculated on the basis of its hydrated form, although during use, it is not necessarily fully or even partially hydrated.

| Example | I | II | III | IV | V | VI | VII |
|---|---|---|---|---|---|---|---|
| Molar feed ratio: ethane/HCl/air | 1/2/3 | 1/2/3.7 | 1/2/4 | 1/2/4 | 1/2/3.7 | 1/2/3.7 | 1/2/3 |
| Catalyst composition (wt percent): | | | | | | | |
| FeCl₂ | 2.0 | 2.0 | 2.0 | 5.0 | 0.5 | 0.35 | 2.0 |
| Rare earth Cl (hydrated) | ¹10.0 | ¹10.0 | 10.0 | 10.0 | 10.0 | 10.0 | 10.0 |
| LiCl | 0.06 | 0.06 | 0.06 | 1.0 | 0.1 | 0.07 | 0.48 |
| Other | ²0.30 | | | | | | ²0.3 |
| Catalyst support | Alumina | Alumina | Alumina | Alumina | Alumina | Alumina | Alumina |
| Temperature (° C.) | 550 | 575 | 550 | 550 | 550 | 525 | 600 |
| Pressure (atm.) | 1 | 1 | 1 | 1 | 1 | 1 | 1 |
| Ethane conversion (percent) | 82.4 | 90.9 | 90.6 | 84.2 | 91.4 | 90.8 | 87.4 |
| Ethylene yield (percent) | 85.3 | 78.7 | 75.0 | 73.6 | 79.0 | 81.9 | 84.3 |

¹ Cerium chloride.
² Copper chloride.

Example VIII

The procedure of the preceding examples was repeated employing the following catalysts (in weight percent, based on the total weight of catalyst and support): (1) 0.35 percent iron chloride, 10.0 percent rare earth chlorides (hydrated), 1.0 percent lithium chloride, and 4.0 percent manganese chloride supported on alumina; (2) 0.35 percent iron chloride, 10.0 percent rare earth chlorides (hydrated), and 1.0 percent lithium chloride supported on alumina; (3) 0.35 percent iron chloride, 10.0 percent cerium chloride (hydrated), 1.0 percent lithium chloride, and 4.0 percent manganese chloride supported on chroma-alumina. High yields of ethylene were obtained with each catalyst.

Example IX

The preceding examples are repeated so that each example includes runs which differ with regard to use of the following iron chloride concentrations (in weight percent, based on the total weight of catalyst and support): 0.01, 0.05, 0.1, 0.15, 0.2, 0.25, 0.3, 0.35, 0.4, 0.45, 0.5, 1.0, 5.0, 10.0. Optimum results are indicated to be between 0.3 and 0.4 weight percent.

Example X

The preceding examples are repeated so that each example includes runs which differ in the use of the following copper chloride concentrations (in weight percent based on the total weight of catalyst and support): 1, 3, 5, 7, 10.

Example XI

The preceding examples are repeated so that each example includes runs which differ with regard to use of cerium chloride, didymium chloride, or rare earth chlorides extracted from monazite without removal or cerium weight percent, based on the total weight of support and hydrated catalyst): 0.01, 0.1, 1, 5, 10, 15, 20. Cerium chloride performs best, and optimum results therefor are indicated to be between 5 and 15 weight percent.

Example XII

The preceding examples are repeated so that each example includes runs which differ with regard to use of lithium chloride, sodium chloride, potassium chloride, rubidium chloride or cesium chloride, each in the following concentrations (in weight percent, based on the total weight of catalyst and support): 0.01, 0.05, 0.1, 0.5, 1, 2, 5, 10. Lithium chloride performs best, and optimum results therefor are indicated to be between 0.5 and 2 weight percent.

Example XIII

The preceding examples are repeated so that each example includes runs which differ with regard to use of manganese chloride, calcium chloride, zinc chloride or titanium chloride, each in the following concentrations (in weight percent, based on the total weight of catalyst and support): 0.01, 1, 5, 10, 20. Manganese chloride performs best, with calcium chloride being better than either zinc chloride or titanium chloride; optimum results for both manganese chloride and calcium chloride are indicated to be between 1 and 10 weight percent.

Example XIV

The preceding examples are repeated so that each example includes runs at the following temperatures: 300° C., 350° C., 650° C., and 700° C. Optimum results are indicated to be between 350° C. and 650° C.

Example XV

The preceding examples are repeated so that each example includes runs which differ with regard to use of the following catalyst supports: sand, diatomaceous earth, alumina, silica gel, pumice, bauxite, or chromia-alumina. Chroma-alumina performs best, with alumina and silica gel being better than the other supports.

Example XVI

The preceding examples are repeated so that each example includes runs which differ with regard to the following pressures (in atmospheres): 2, 5, 10, 13, 15, 20, 30.

Example XVII

The preceding examples are repeated so that each example includes runs which differ with regard to the use of pure oxygen or air as a component of the feed stream.

Example XVIII

The preceding examples are repeated, first omitting the rare earth chlorides and, second, employing the following concentrations of iron chloride and rare earth chlorides (in weight percent, based on the total weight of catalyst and support): (1) 4 percent iron chloride and 3 percent rare earth chlorides, (2) 10 percent chloride and 0.5 percent rare earth chlorides, (3) 15 percent iron chloride and 0.15 percent rare earth chlorides. In each instance low yields of ethylene are experienced.

While the catalytic mixtures of this invention can be deposited upon the fluidized solid support in a number of different ways, a very simple and highly preferred method of impregnating the support is to dissolve in water or an alcohol a weighed amount of the components of the catalyst mixture. A weighed amount of the support is then added to the water or alcohol, and the contents stirred until completely homogenous. The water or alcohol is then evaporated at low temperature from the so-formed slurry. The evaporation is conveniently done by drying at a low temperature, e.g. about 100° C. in a low temperature air circulating oven. The dry impregnated support remaining can then be employed in the process of this invention.

I claim:
1. A process for the production of ethylene which comprises, in combination, contacting reactants comprising ethane, hydrogen chloride and oxygen with a fluidized catalytic material comprising a catalyst and a support in a reaction zone, said catalyst comprising from about 0.15 weight percent to about 3 weight percent iron chloride, based on the total weight of said caalyst and support, and rare earth halide, the weight ratio of said rare earth halide to said iron chloride being in excess of 1 to 1.

2. The process of claim 1 further characterized by said rare earth halide being present in a concentration of from about 5 to about 20 weight percent in its hydrated form, based on the total weight of catalyst and support.

3. The process of claim 1 further characterized by said catalyst including alkali metal halide.

4. The process of claim 3 further characterized by said alkali metal chloride being lithium chloride and being present in a concentration of from about 0.05 to about 3.0 weight percent, based on the total weight of catalyst and support.

5. The process of claim 1 further characterized by one of said reactants being fed to said reaction zone at a point substantially vertically displaced from the feed point for the other of said reactants.

6. The process of claim 5 further characterized by said one of said reactants being ethane.

7. The process of claim 1 further characterized by said support being selected from the group consisting of chromia-alumina, alumina and silica.

8. The process of claim 1 further characterized by said catalyst including a compound selected from the group consisting of manganese chloride, calcium chloride, zinc chloride, and titanium chloride.

9. The process of claim 8 further characterized by said compound being present in a concentration of from about 1 to about 10 weight percent, based on the total weight of catalyst and support.

10. The process of claim 1 wherein said reaction zone is maintained at a pressure of from atmospheric to about 30 atmospheres.

References Cited
UNITED STATES PATENTS

| | | | |
|---|---|---|---|
| 2,971,995 | 2/1961 | Arganbright | 260—683.3 |
| 3,119,883 | 1/1964 | Kluksdahl | 260—683.3 |

DELBERT E. GANTZ, Primary Examiner

J. M. NELSON, Assistant Examiner

U.S. Cl. X.R.

260—683.3, 680 E